US010061026B2

(12) United States Patent
Tanaka et al.

(10) Patent No.: US 10,061,026 B2
(45) Date of Patent: Aug. 28, 2018

(54) PHOTOELECTRIC SENSOR WITH DISTURBANCE DETECTION

(71) Applicant: AZBIL CORPORATION, Chiyoda-ku (JP)

(72) Inventors: Minoru Tanaka, Chiyoda-ku (JP); Hiroshi Hatanaka, Chiyoda-ku (JP); Takayuki Hosoi, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 113 days.

(21) Appl. No.: 15/193,928

(22) Filed: Jun. 27, 2016

(65) Prior Publication Data
US 2016/0377718 A1 Dec. 29, 2016

(30) Foreign Application Priority Data

Jun. 29, 2015 (JP) ................................. 2015-129886

(51) Int. Cl.
G06M 7/00 (2006.01)
G01S 17/02 (2006.01)
G01S 7/497 (2006.01)

(52) U.S. Cl.
CPC ............ *G01S 17/026* (2013.01); *G01S 7/497* (2013.01)

(58) Field of Classification Search
CPC ....... G01S 7/497; G01S 7/4913; G01S 17/026
See application file for complete search history.

(56) References Cited

U.S. PATENT DOCUMENTS

| 5,852,292 | A | 12/1998 | Blümcke et al. | |
|---|---|---|---|---|
| 2003/0010891 | A1* | 1/2003 | Mizuhara | G01J 1/32 250/205 |
| 2005/0184301 | A1* | 8/2005 | Nagasaka | G01S 17/48 257/96 |

FOREIGN PATENT DOCUMENTS

| DE | 195 37 615 A1 | 4/1997 |
|---|---|---|
| EP | 0 685 748 A1 | 12/1995 |
| JP | 62-7733 | 2/1987 |
| JP | 63-263917 | 10/1988 |
| JP | 2003-023347 | 1/2003 |

OTHER PUBLICATIONS

Extended European Search Report dated Nov. 22, 2016 in Patent Application No. 16176608.4.

* cited by examiner

Primary Examiner — Thanh Luu
(74) Attorney, Agent, or Firm — Oblon, McClelland, Maier & Neustadt, L.L.P.

(57) ABSTRACT

A photoelectric sensor includes the following components. A disturbance detection unit detects a disturbance by comparing a light reception result obtained by a light receiver with a first threshold and with a second threshold for a predetermined period in a state where no light is transmitted by a light transmitter. The second threshold takes a value of a sign opposite to that of the first threshold relative to a no-signal state. A waiting unit waits for the light reception result obtained by the light receiver to become within a range from the first threshold to the second threshold upon detection of a disturbance. A disturbance type determination unit causes detection of a disturbance to be performed again after the waiting. A light transmission instruction unit instructs the light transmitter to transmit light when no disturbance is detected for a predetermined period.

18 Claims, 4 Drawing Sheets

PHOTOELECTRIC SENSOR WITH DISTURBANCE DETECTION

CROSS-REFERENCE TO RELATED APPLICATIONS

The present application claims priority to Japanese Application No. 2015-129886, filed Jun. 29, 2015, the entire contents of which are incorporated herein by reference.

BACKGROUND OF THE INVENTION

1. Field of the Invention

This invention relates to photoelectric sensors capable of avoiding erroneous operation caused by mutual interference.

2. Description of the Related Art

Erroneous operation caused by mutual interference of a plurality of sequentially arranged photoelectric sensors and erroneous operation caused by illumination light having alternating-current (AC) harmonic components, such as light of inverter fluorescent lamps, have been issues in the related art. In addition, the use of light-emitting-diode (LED) illumination has recently been spreading. Since LED illumination often has AC harmonic components, the likelihood of photoelectric sensors operating erroneously is expected to increase.

To cope with the issues described above, there are photoelectric sensors that avoid erroneous operation caused by a disturbance having a pulse waveform and a disturbance having an AC waveform (see, for example, Japanese Examined Patent Application Publication No. 62-7733 and Japanese Unexamined Patent Application Publication Nos. 63-263917 and 2003-23347). A photoelectric sensor disclosed in Japanese Examined Patent Application Publication No. 62-7733 delays transmission of light by a predetermined period if a disturbance is detected. In addition, a photoelectric sensor disclosed in Japanese Unexamined Patent Application Publication No. 63-263917 transmits light while changing the light transmission cycle.

Further, a photoelectric sensor disclosed in Japanese Unexamined Patent Application Publication No. 2003-23347 detects a disturbance having an AC waveform by providing positive and negative thresholds in addition to a threshold used to determine the presence or absence of a target object. If a disturbance having an AC waveform is detected, the photoelectric sensor receives light at a zero-cross timing of the AC waveform. If no disturbance is detected for a predetermined period, the mode is switched into another mode. If a disturbance is detected in the other mode, transmission of light is delayed by a predetermined period.

The method disclosed in Japanese Examined Patent Application Publication No. 62-7733, however, is less effective against mutual interference. Specifically, since strong disturbance light is input when mutual interference of photoelectric sensors occurs, a received light signal does not have a pulse waveform but rather has a fluctuating waveform in which the signal fluctuates a plurality of times. For this reason, even if light is transmitted after a predetermined period as in the method disclosed in Japanese Examined Patent Application Publication No. 62-7733, a light signal supposed to be received may be lost due to saturation caused by the fluctuating waveform. In addition, the method disclosed in Japanese Examined Patent Application Publication No. 62-7733 is unable to avoid the influence of AC disturbance light.

The method disclosed in Japanese Unexamined Patent Application Publication No. 63-263917 is less effective against AC disturbance light. Specifically, light is transmitted while changing the light transmission cycle in the method disclosed in Japanese Unexamined Patent Application Publication No. 63-263917. Coincidence of reception timings of AC disturbance light and light of interest is inevitable, which may lead to erroneous operation.

The method disclosed in Japanese Unexamined Patent Application Publication No. 2003-23347 is less effective against mutual interference. Specifically, as described above, since strong disturbance light is input when mutual interference of photoelectric sensors occurs, a received light signal does not have a pulse waveform but rather has a fluctuating waveform. For this reason, even if light is transmitted after a predetermined period as in the method disclosed in Japanese Unexamined Patent Application Publication No. 2003-23347, the light signal supposed to be received may be lost due to superimposition of the fluctuating waveform.

In addition, the method disclosed in Japanese Unexamined Patent Application Publication No. 2003-23347 requires a comparator having a positive threshold and a comparator having a negative threshold in addition to a comparator having a threshold used to determine the presence or absence of a target object, increasing the scale of the circuit. Further, since the photoelectric sensor operates while switching between an AC disturbance light handling mode and a mutual interference handling mode, processing is complicated. The method disclosed in Japanese Unexamined Patent Application Publication No. 2003-23347 is to control the light transmission timing so that the light reception timing matches the zero-cross timing of the AC waveform of the disturbance. However, since the processing speed of timing control is limited, the noise frequency that can be coped with is limited. In addition, it is difficult to cause the light reception timing to completely match the zero-cross timing if the noise frequency is high, and erroneous operation may occur if the timing is too early and too late.

SUMMARY OF THE INVENTION

This invention has been made to overcome the issues described above, and it is an object of this invention to provide photoelectric sensors capable of avoiding erroneous operation caused by mutual interference more reliably than a configuration of the related art.

A photoelectric sensor according to an aspect of this invention includes a light transmitter that transmits light and a light receiver that receives reflected light of the light transmitted by the light transmitter and detects presence or absence of a target object by comparing a light reception result obtained by the light receiver with a first threshold relative to a no-signal state. The photoelectric sensor further includes a disturbance detection unit that detects a disturbance by comparing the light reception result obtained by the light receiver with the first threshold and with a second threshold for a predetermined period in a state where no light is transmitted by the light transmitter, the second threshold taking a value of a sign opposite to that of the first threshold relative to the no-signal state; a waiting unit that waits, upon detection of a disturbance by the disturbance detection unit, for the light reception result obtained by the light receiver to become within a range from the first threshold to the second threshold; a disturbance type determination unit that causes the disturbance detection unit to perform detection of a disturbance again after the waiting unit has finished waiting; and a light transmission instruction unit that instructs the light transmitter to transmit light when no disturbance is detected by the disturbance detection unit for a predetermined period.

According to the aspect of this invention, since the photoelectric sensor is configured as described above, the photoelectric sensor is capable of avoiding erroneous operation caused by mutual interference more reliably than a configuration of the related art.

DESCRIPTION OF THE PREFERRED EMBODIMENTS

An embodiment of this invention will be described in detail below with reference to the accompanying drawings.

Figure 1:
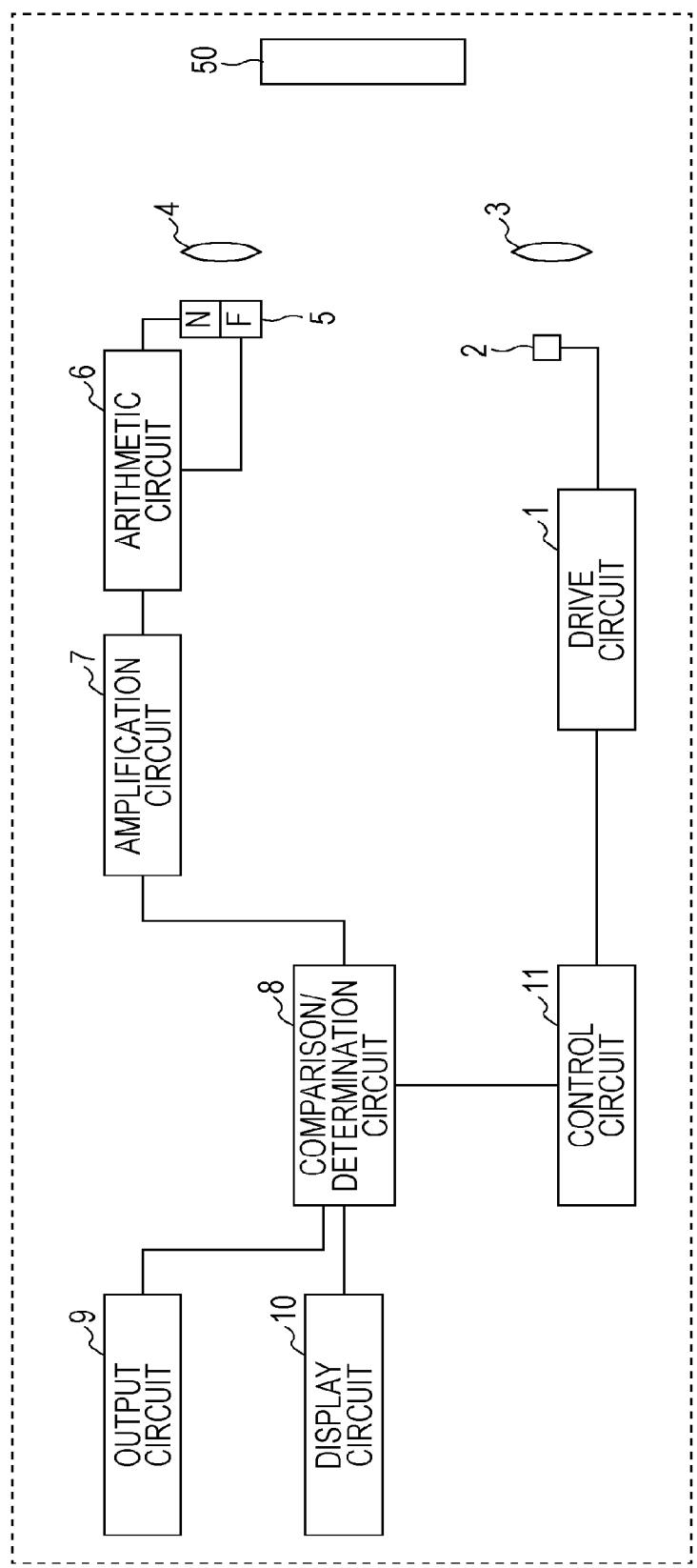
FIG. 1 is a diagram illustrating an example of a configuration of a photoelectric sensor according to an embodiment of this invention.

FIG. 1 is a diagram illustrating an example of a configuration of a photoelectric sensor according to an embodiment of this invention.

The photoelectric sensor includes a light transmitter that transmits light and a light receiver that receives reflected light of the light transmitted by the light transmitter. The photoelectric sensor detects the presence or absence of a target object 50 by comparing a light reception result obtained by the light receiver with a determination threshold. Herein, the determination threshold is a threshold (first threshold) that takes a positive value relative to a no-signal state. In addition, a description will be given below by using an example case where a distance-settable photoelectric sensor that detects the presence or absence of the target object 50 located at a distance smaller than the set distance with a two-element segmented photodiode whose light-receiving surface, which serves as a light-receiving element (one-dimensional position sensitive element) 5, is segmented to a near-side (N-side) light-receiving surface and a far-side (F-side) light-receiving surface.

As illustrated in FIG. 1, the photoelectric sensor includes a drive circuit 1, a light-transmitting element 2, a light-transmitting optical system 3, a light-receiving optical system 4, the light-receiving element 5, an arithmetic circuit 6, an amplification circuit 7, a comparison/determination circuit 8, an output circuit 9, a display circuit 10, and a control circuit 11.

In the configuration illustrated in FIG. 1, the drive circuit 1, the light-transmitting element 2, and the light-transmitting optical system 3 constitute the light transmitter, whereas the light-receiving optical system 4, the light-receiving element 5, the arithmetic circuit 6, and the amplification circuit 7 constitute the light receiver.

The drive circuit 1 generates a current supplied to the light-transmitting element 2.

The light-transmitting element 2 is driven by the current generated by the drive circuit 1 and emits light. For example, an LED is used as this light-transmitting element 2.

The light-transmitting optical system 3 condenses the light emitted by the light-transmitting element 2. The light condensed by this light-transmitting optical system 3 is transmitted to a target region. If the target object 50 is present in the target region, the light is reflected by this target object 50.

The light-receiving optical system 4 condenses the light reflected by the target object 50 located in the target region.

The light-receiving element 5 is a two-element segmented photodiode whose light-receiving surface is segmented into the N-side light-receiving surface and the F-side light-receiving surface and converts the light condensed by the light-receiving optical system 4 into electric signals (currents). This light-receiving element 5 is capable of detecting an amount of light received on the N-side light-receiving surface (first received light signal) and an amount of light received on the F-side light-receiving surface (second received light signal).

The arithmetic circuit 6 converts the amount of light (current) received on the N-side light-receiving surface and the amount of light (current) received on the F-side light-receiving receiving surface, which are detected by the light-receiving element 5, into voltages and determines a difference between the voltages.

The amplification circuit 7 amplifies the voltage obtained by the processing performed by the arithmetic circuit 6 at a predetermined gain. The amplified voltage (differential signal) obtained by this amplification circuit 7 corresponds to a light reception result (distance signal generated from the first and second received light signals).

The comparison/determination circuit 8 compares the amplified voltage obtained by the amplification circuit 7 with the determination threshold (positive threshold) to detect the presence or absence of the target object 50 in the target region. At that time, the comparison/determination circuit 8 determines that no object is in the target region if the amplified voltage obtained by the amplification circuit 7 is lower than the determination threshold and determines that an object is in the target region if the amplified voltage obtained by the amplification circuit 7 is higher than or equal to the determination threshold. For example, an up-down counter is used as this comparison/determination circuit 8.

The output circuit 9 outputs information indicating a determination result obtained by the comparison/determination circuit 8. At that time, the output circuit 9 causes an output transistor to operate based on the information indicating the determination result.

The display circuit 10 displays the information indicating the determination result obtained by the comparison/determination circuit 8 using an indicator lamp or the like.

Figure 2:
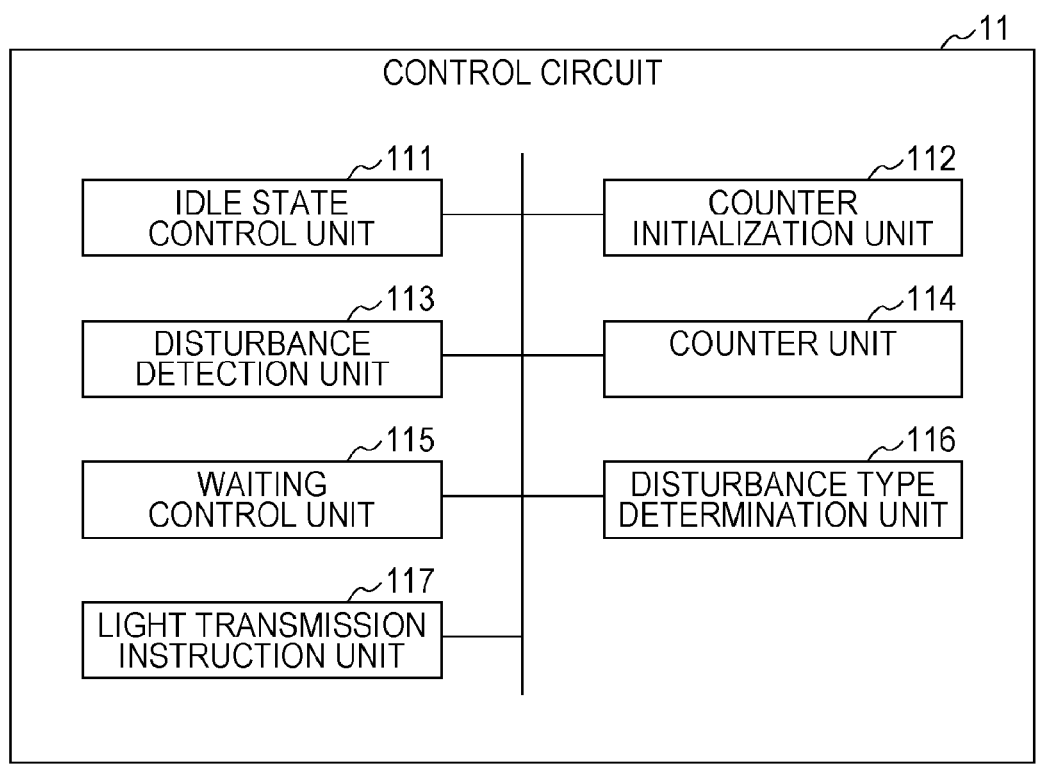
FIG. 2 is a diagram illustrating an example of a configuration of a control circuit in the embodiment of this invention.

The control circuit 11 controls operations of the individual components of the photoelectric sensor. The control circuit 11 also has a function for controlling the light transmission timing for the light transmitter. As illustrated in FIG. 2, this control circuit 11 includes an idle state control unit 111, a counter initialization unit 112, a disturbance detection unit 113, a counter unit 114, a waiting control unit 115, a disturbance type determination unit 116, and a light transmission instruction unit 117. The control circuit 11 is implemented by software-based program processing using a CPU.

The idle state control unit 111 causes the photoelectric sensor to idle for a predetermined period upon the start of the photoelectric sensor or after every light transmission/reception process performed by the photoelectric sensor.

The counter initialization unit 112 initializes and resets a count value of the counter unit 114 upon the start of the photoelectric sensor and after every light transmission/reception process performed by the photoelectric sensor, respectively.

The disturbance detection unit 113 detects a disturbance by comparing the received light signal with the positive threshold and a negative threshold (second threshold) for a predetermined period in a state where no light is transmitted by the light transmitter, after the photoelectric sensor has idled for a predetermined time or upon receipt of an instruction from the disturbance type determination unit 116. Here, the positive threshold is the same as the determination threshold used by the comparison/determination circuit 8. In addition, the negative threshold is a threshold that takes a negative value relative to the no-signal state. The disturbance detection unit 113 determines that a disturbance has occurred if the received light signal is larger than the positive threshold or is smaller than the negative threshold.

The counter unit 114 counts the number of times a disturbance has been detected by the disturbance detection unit 113.

The counter unit 114 may separately count the number of times a disturbance has been detected by the disturbance detection unit 113 depending on the detection state. In this case, the counter unit 114 separately counts a first number of times a disturbance has been detected by the disturbance detection unit 113 as a result of the received light signal becoming larger than the positive threshold and a second number of times a disturbance has been detected by the disturbance detection unit 113 as a result of the received light signal becoming smaller than the negative threshold.

The waiting control unit 115 waits for the received light signal to become within a range from the negative threshold to the positive threshold if a disturbance is detected by the disturbance detection unit 113. Specifically, the waiting control unit 115 waits for the received light signal to become smaller than or equal to the positive threshold if a disturbance is detected by the disturbance detection unit 113 as a result of the received light signal becoming larger than the positive threshold. Likewise, the waiting control unit 115 waits for the received light signal to become larger than or equal to the negative threshold if a disturbance is detected by the disturbance detection unit 113 as a result of the received light signal becoming smaller than the negative threshold.

The disturbance type determination unit 116 determines the type of the disturbance by comparing the number of times counted by the counter unit 114 with a predetermined value after the waiting control unit 115 has finished waiting. At that time, the disturbance type determination unit 116 determines that a disturbance has an AC waveform if the number of times counted by the counter unit 114 is larger than the predetermined value and causes the light transmission instruction unit 117 to instruct the light transmitter to transmit light. Otherwise, the disturbance type determination unit 116 determines that a disturbance has a fluctuating waveform due to mutual interference and causes the disturbance detection unit 113 to perform detection of a disturbance again.

Note that the predetermined value is set to be larger than the number of fluctuations in the fluctuating waveform of the disturbance. The number of fluctuations in the disturbance can be determined from circuitry of the photoelectric sensor.

If the counter unit 114 separately counts the number of times a disturbance has been detected depending on the detection state, the disturbance type determination unit 116 may determine the type of the disturbance in accordance with the numbers of times separately counted. In such a case, the disturbance type determination unit 116 determines the type of the disturbance by comparing the first number of times counted by the counter unit 114 with a first predetermined value after the waiting control unit 115 has finished waiting from when the received light signal has become larger than the positive threshold. On the other hand, the disturbance type determination unit 116 determines the type of the disturbance by comparing the second number of times counted by the counter unit 114 with a second predetermined value after the waiting control unit 115 has finished waiting from when the received light signal has become smaller than the negative threshold. Note that the disturbance type determination method is the same as the one described above. In addition, the second predetermined value is larger than the first predetermined value.

If the counter unit 114 does not separately count the number of times a disturbance has been detected depending on the detection state, the disturbance type determination unit 116 can determine the type of the disturbance in the following manner. Specifically, the disturbance type determination unit 116 determines the type of the disturbance by comparing the number of times counted by the counter unit 114 with the first predetermined value after the waiting control unit 115 has finished waiting from when the received light signal has become larger than the positive threshold. On the other hand, the disturbance type determination unit 116 determines the type of the disturbance by comparing the number of times counted by the counter unit 114 with the second predetermined value after the waiting control unit 115 has finished waiting from when the received light signal has become smaller than the negative threshold. Note that the disturbance type determination method is the same as the one described above. In addition, the second predetermined value is a value larger than the first predetermined value.

The light transmission instruction unit 117 instructs the light transmitter to transmit light when no disturbance is detected by the disturbance detection unit 113 for a predetermined period or upon receipt of an instruction from the disturbance type determination unit 116. Note that light needs to be transmitted by the light transmitter at a falling edge (i.e., a state where the received light signal changes from the positive level toward the negative level).

Figure 3:
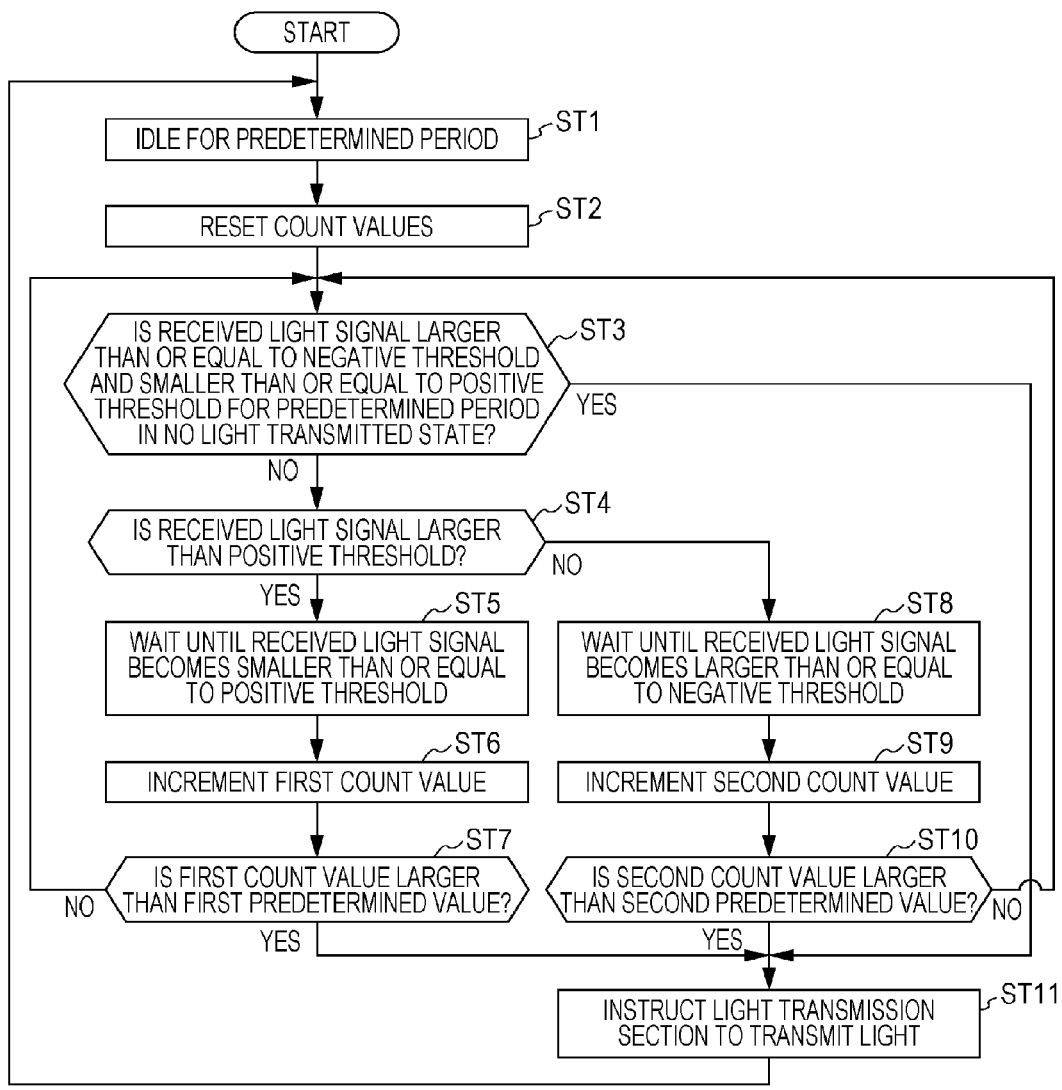
FIG. 3 is a flowchart illustrating an example of an operation of the photoelectric sensor according to the embodiment of this invention.

Referring to FIG. 3, an example of a light-transmission-timing control operation of the photoelectric sensor thus configured will be described next. Note that it is assumed below that the counter unit 114 separately counts the number of times a disturbance has been detected depending on the disturbance detection state.

As illustrated in FIG. 3, in the example of the light-transmission-timing control operation of the photoelectric sensor, the idle state control unit 111 causes the photoelectric sensor to idle for a predetermined period (e.g., 140 μs) upon the start of the photoelectric sensor or after each light transmission/reception process performed by the photoelectric sensor (step ST1). In addition, the counter initialization unit 112 initializes or resets the count values obtained by the counter unit 114 (step ST2).

After the photoelectric sensor has idled for the predetermined period, the disturbance detection unit 113 compares the received light signal with the positive threshold and with the negative threshold for a predetermined period (e.g., 40 µs) in a state where no light is transmitted by the light transmitter and determines whether the received light signal is larger than or equal to the negative threshold and smaller than or equal to the positive threshold (step ST3).

If the disturbance detection unit 113 determines that the received light signal is larger than or equal to the negative threshold and smaller than or equal to the positive threshold for the predetermined period in step ST3, the disturbance detection unit 113 determines that no disturbance is detected, and the process proceeds to step ST11.

If the disturbance detection unit 113 determines that the received light signal is not within a range from the negative threshold to the positive threshold in step ST3, the disturbance detection unit 113 determines whether the received light signal is larger than the positive threshold (step ST4).

If the disturbance detection unit 113 determines that the received light signal is larger than the positive threshold in step ST4, the waiting control unit 115 waits for the received light signal to become smaller than or equal to the positive threshold (step ST5).

In addition, the counter unit 114 increments a first count value (first number of times) (step ST6).

Then, the disturbance type determination unit 116 determines whether the first count value obtained by the counter unit 114 is larger than the first predetermined value (e.g., 3) (step ST7).

If the first count value is smaller than or equal to the first predetermined value in step ST7, the disturbance type determination unit 116 determines that the disturbance has a fluctuating waveform due to mutual interference. The process then returns to step ST3, in which the disturbance detection unit 113 is caused to perform detection of a disturbance again.

On the other hand, if the first count value is larger than the first predetermined value in step ST7, the disturbance type determination unit 116 determines that the disturbance has an AC waveform. The process then proceeds to step ST11.

If the disturbance detection unit 113 determines that the received light signal is smaller than the negative threshold in step ST4, the waiting control unit 115 waits for the received light signal to become larger than or equal to the negative threshold (step ST8).

In addition, the counter unit 114 increments a second count value (second number of times) (step ST9).

Then, the disturbance type determination unit 116 determines whether the second count value obtained by the counter unit 114 is larger than the second predetermined value (e.g., 5) (step ST10). Note that the second predetermined value is set to be larger than the first predetermined value.

If the second count value is smaller than or equal to the second predetermined value in step ST10, the disturbance type determination unit 116 determines that the disturbance has a fluctuating waveform due to mutual interference. The process then returns to step ST3, in which the disturbance detection unit 113 is caused to perform detection of a disturbance again.

If the second count value is larger than the second predetermined value in step ST10, the disturbance type determination unit 116 determines that the disturbance has an AC waveform. The process then proceeds to step ST11.

If no disturbance is detected by the disturbance detection unit 113 for the predetermined period in step ST3 or if the disturbance is determined to have an AC waveform by the disturbance type determination unit 116 in step ST7 or ST10, the light transmission instruction unit 117 instructs the light transmitter to transmit light at that timing (step ST11). Then, the photoelectric sensor performs an ordinary light transmission/reception process.

The exemplary light-transmission-timing control operation will be described next using specific examples. It is assumed that the initial values for the first and second count values are 0, the first predetermined value is 3, and the second predetermined value is 5.

Figure 4:
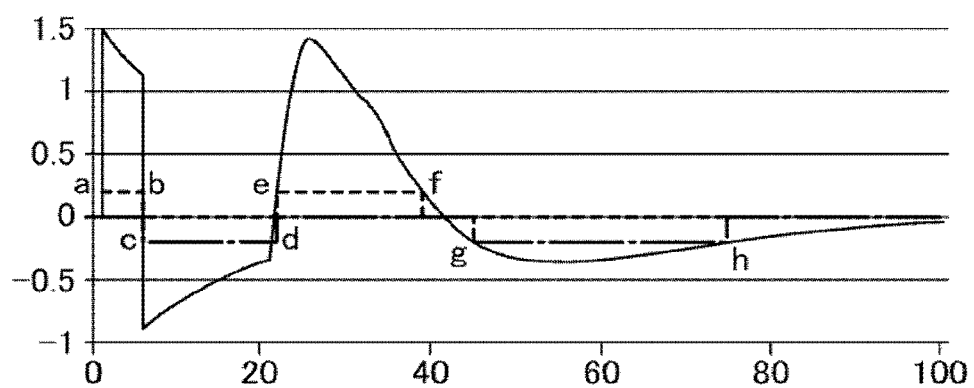
FIG. 4 is a diagram illustrating an example of an operation of the photoelectric sensor according to the embodiment of this invention (in the case where a disturbance has a fluctuating waveform due to mutual interference)

First, the case where a disturbance due to mutual interference is input will be described with reference to FIG. 4. FIG. 4 illustrates the case where the positive threshold and the negative threshold are set to 0.2 V and −0.2 V, respectively.

When a disturbance due to mutual interference is input, the received light signal has a fluctuating waveform. FIG. 4 illustrates a specific example of such a received light signal. In this case, the received light signal becomes larger than the positive threshold at point a, at which the disturbance detection unit 113 detects a disturbance. Then, the waiting control unit 115 waits for the received light signal to become smaller than or equal to the positive threshold (point b), and the counter unit 114 increments the first count value. Since the first count value (=1) is smaller than or equal to the first predetermined value (=3) at this point, the disturbance type determination unit 116 determines that the disturbance has a fluctuating waveform due to mutual interference and instructs the disturbance detection unit 113 to perform the operation again.

Then, the received light signal becomes smaller than the negative threshold at point c, at which the disturbance detection unit 113 detects a disturbance. Then, the waiting control unit 115 waits for the received light signal to become larger than or equal to the negative threshold (point d), and the counter unit 114 increments the second count value. Since the second count value (=1) is smaller than or equal to the second predetermined value (=5) at this point, the disturbance type determination unit 116 determines that the disturbance has a fluctuating waveform due to mutual interference and instructs the disturbance detection unit 113 to perform the operation again. Thereafter, the aforementioned operation is repeated.

The fluctuation due to the disturbance ends at point h, and the waveform stabilizes thereafter. Consequently, no disturbance is detected by the disturbance detection unit 113 for a predetermined period. At that timing, the light transmitter transmits light.

With the operation described above, the influence of a disturbance having a fluctuating waveform due to mutual interference is successfully avoided.

Figure 5:
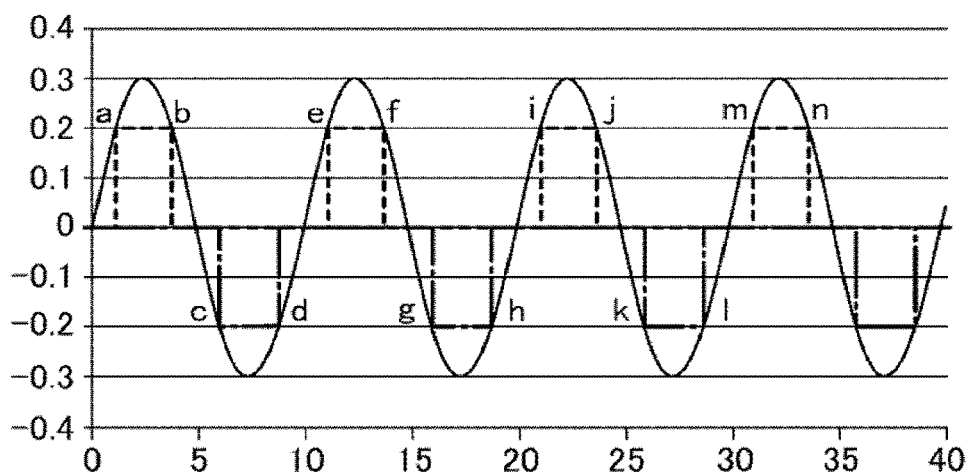
FIG. 5 is a diagram illustrating an example of an operation of the photoelectric sensor according to the embodiment of this invention (in the case where a disturbance has an AC waveform).

The case where a disturbance having an AC waveform as illustrated in FIG. 5 is input will be described next. FIG. 5 illustrates the case where the positive threshold and the negative threshold are set to 0.2 V and −0.2 V, respectively.

In this case, the received light signal becomes larger than the positive threshold at point a, at which the disturbance detection unit 113 detects a disturbance. Then, the waiting control unit 115 waits for the received light signal to become smaller than or equal to the positive threshold (point b). The counter unit 114 then increments the first count value. Since the first count value (=1) is smaller than or equal to the first predetermined value (=3) at this point, the disturbance type determination unit 116 determines that the disturbance has a fluctuating waveform due to mutual interference and instructs the disturbance detection unit 113 to perform the operation again.

Then, the received light signal becomes smaller than the negative threshold at point c, at which the disturbance detection unit 113 detects a disturbance. Then, the waiting control unit 115 waits for the received light signal to become larger than or equal to the negative threshold (point d). The counter unit 114 then increments the second count value. Since the second count value (=1) is smaller than or equal to the second predetermined value (=5) at this point, the disturbance type determination unit 116 determines that the disturbance has a fluctuating waveform due to mutual interference and instructs the disturbance detection unit 113 to perform the operation again. Thereafter, the aforementioned operation is repeated.

The number of fluctuations in the fluctuating waveform of the disturbance can be determined from circuitry of the photoelectric sensor, and the first predetermined value is set to be larger than or equal to the number of fluctuations. When the first count value (=4) becomes larger than the first predetermined value (=3) at point n, the disturbance type determination unit 116 can eliminate a possibility of the disturbance having a fluctuating waveform due to mutual interference and determine that the disturbance has an AC waveform. At this timing (timing at which the disturbance having an AC waveform has become small), the light transmitter transmits light.

A disturbance due to mutual interference is not necessarily caused by only one photoelectric sensor. Accordingly, the first predetermined value is set to a value at least twice as large as the number of fluctuations, for example. In this way, a possibility of the disturbance being mutual interference from two or less photoelectric sensors can be eliminated, and the disturbance type determination unit 116 can determine that the disturbance has an AC waveform. Likewise, if the first predetermined value is set to a value at least three times as large as the number of fluctuations, a possibility of the disturbance being mutual interference from three or less photoelectric sensors can be eliminated, and the disturbance type determination unit 116 can determine that the disturbance has an AC waveform.

With the operation described above, the influence of a disturbance having an AC waveform is successfully avoided.

A configuration for avoiding both erroneous operation caused by mutual interference and erroneous operation caused by a disturbance having an AC waveform has been described above; however, the photoelectric sensor may be configured to avoid only erroneous operation due to mutual interference. In this case, the counter unit 114 illustrated in FIG. 2 is not needed.

As described above, according to the embodiment, the photoelectric sensor includes the disturbance detection unit 113 that detects a disturbance by comparing the received light signal with the positive threshold and with the negative threshold for a predetermined period in a no-light-transmitted state, the waiting control unit 115 that waits for the received light signal to become within a range from the negative threshold to the positive threshold if a disturbance is detected, the disturbance type determination unit 116 that causes the disturbance detection unit 113 to perform detection of a disturbance again after the waiting control unit 115 has finished waiting, and the light transmission instruction unit 117 that instructs the light transmitter to transmit light if no disturbance is detected for a predetermined period. Accordingly, the photoelectric sensor can avoid erroneous operation caused by mutual interference more reliably than a configuration of the related art.

Further, the photoelectric sensor includes the counter unit 114 that counts the number of times a disturbance has been detected, and the disturbance type determination unit 116 causes the light transmission instruction unit 117 to instruct the light transmitter to transmit light if the obtained number of times is larger than a predetermined value after the waiting control unit 115 has finished waiting. In this way, the photoelectric sensor can also avoid erroneous operation caused by a disturbance having an AC waveform.

In addition, since the determination threshold used to detect the presence or absence of the target object 50 is used as the positive threshold to detect a disturbance, an increase in the circuit scale can be avoided. In addition, since both AC disturbance light and mutual interference can be handled using the same logic, the processing can be simplified.

In addition, the second predetermined value is set to be larger than the first predetermined value. In this way, light can be transmitted by the light transmitter at a timing at which an AC waveform of the disturbance that has exceeded the positive threshold becomes smaller than or equal to the positive threshold. With this configuration, a situation where the photoelectric sensor erroneously operates to detect the target object 50 even though the target object 50 is not in the target region can be avoided.

The case where the light transmission instruction unit 117 instructs the light transmitter to transmit light upon receipt of an instruction from the disturbance type determination unit 116 has been described above; however, the light transmission instruction unit 117 may instruct, after an elapse of a delay time that is adjusted so that the presence or absence of the target object 50 is determined at a timing at which the received light signal involving a disturbance becomes smaller than or equal to the positive threshold, the light transmitter to transmit light in the case where the light transmission instruction unit 117 receives an instruction from the disturbance type determination unit 116. In this case, the light transmission instruction unit 117 determines the delay time in accordance with a frequency of the disturbance determined from the received light signal in the no-signal-transmitted state.

Specifically, in the case where the frequency of the disturbance is high, even if the light transmission instruction unit 117 instructs the light transmitter to transmit light upon receipt of an instruction from the disturbance type determination unit 116, the disturbance may already become large when the comparison/determination circuit 8 performs the determination process after light is transmitted by the light transmitter and processing is performed by the arithmetic circuit 6 and the amplification circuit 7. To avoid such a situation, a delay time is set based on the frequency of the disturbance and the photoelectric sensor is caused to wait. In this way, control can be performed so that light is transmitted at a timing at which the disturbance is small (timing at which the disturbance becomes negative).

Examples of the no-light-transmitted state in which the frequency of the disturbance is detected include a period between light transmission/reception processes performed by the photoelectric sensor, a period after the photoelectric sensor is powered on and before light is transmitted by the light transmitter for the first time, and a period for which the set distance (sensitivity) of the photoelectric sensor is automatically adjusted. In addition, the no-light-transmitted state may be created by causing the light transmitter of the photoelectric sensor to stop transmitting light in accordance with an instruction from outside.

The case of using a two-element segmented photodiode as the light-receiving element 5 whose output changes depending on the reflected-light reception position has been described above; however, the light-receiving element 5 is not limited to the photodiode. For example, a position sensitive element such as a position sensitive detector (PSD) capable of detecting the reflected-light reception position may be used.

In addition, the case of using a positive threshold and a negative threshold as the first threshold and the second threshold, respectively, has been described above; however, the first and second thresholds are not limited to these ones. For example, since the polarity of the signal waveform becomes opposite depending on the configuration of the amplification circuit 7, a negative threshold and a positive threshold may preferably be used as the first threshold and the second threshold, respectively, in some cases.

In addition, it has been described above that the arithmetic circuit 6 converts an amount of light received on the N-side light-receiving surface and an amount of light received on the F-side light-receiving surface, which are detected by the light-receiving element 5, into voltages and determines a difference between the voltages; however, the configuration is not limited to this one. The arithmetic circuit 6 may convert an amount of light received on the N-side light-receiving surface and an amount of light received on the F-side light-receiving surface, which are detected by the light-receiving element 5, into voltages and do a division using the voltages.

The case of using a distance-settable photoelectric sensor has been described above as an example; however, the type of the photoelectric sensor is not limited to this one. The embodiment of the present invention is similarly applicable to other types of the photoelectric sensors, specifically, photoelectric sensors (reflective and retroreflective photoelectric sensors) that include a light transmitter that transmits light and a light receiver that receives reflected light of the light transmitted by the light transmitter and detects the presence or absence of a target object by comparing a light reception result obtained by the light receiver with a threshold relative to a no-signal state.

It should be noted that any given component described in the embodiment may be modified or omitted within the scope of the invention of this application.

For example, the advantageous effects of the present invention do not change even if the threshold used to detect the presence or absence of the target object 50 and the first threshold used to detect a disturbance are set to different values, for example.

What is claimed is:

1. A photoelectric sensor to detect presence or absence of a target object by performing a light transmission/reception process, the photoelectric sensor comprising:
   a light transmitter that transmits light;
   a light receiver that receives reflected light of the light transmitted by the light transmitter; and
   processing circuitry configured to
      detect a disturbance by comparing a light reception result obtained by the light receiver with a first threshold and with a second threshold for a predetermined period in a state where no light is transmitted by the light transmitter, the second threshold taking a value of a sign opposite to that of the first threshold relative to a no-signal state,
      wait, after detection of the disturbance, for the light reception result obtained by the light receiver to become within a range from the first threshold to the second threshold,
      perform detection of the disturbance again after the waiting has finished waiting, and
      instruct the light transmitter to transmit light when no disturbance is detected for a predetermined period, wherein
   the processing circuitry is further configured to determine that the disturbance has occurred when the light reception result is larger than the first threshold or is smaller than the second threshold, and cause the photoelectric sensor to be idle for a predetermined period after every light transmission/reception process performed by the photoelectric sensor.

2. The photoelectric sensor according to claim 1, wherein the processing circuitry is further configured to:
   count a number of times the disturbance has been detected, and
   instruct the light transmitter to transmit light when the counted number of times is larger than a predetermined value after the waiting has finished.

3. The photoelectric sensor according to claim 2, wherein the processing circuitry is further configured to instruct, after an elapse of a delay time that is adjusted so that the presence or absence of the target object is determined at a timing at which the light reception result involving the disturbance becomes smaller than or equal to the first threshold, the light transmitter to transmit light.

4. The photoelectric sensor according to claim 3, wherein the processing circuitry is further configured to set the delay time in accordance with a frequency of the disturbance determined from the light reception result obtained by the light receiver in the state where no light is transmitted by the light transmitter.

5. The photoelectric sensor according to claim 4, wherein the state where no light is transmitted by the light transmitter includes a period between light transmission/reception processes performed by the photoelectric sensor.

6. The photoelectric sensor according to claim 4, wherein the state where no light is transmitted by the light transmitter includes a period after the photoelectric sensor is powered on and before the light transmitter transmits light for a first time.

7. The photoelectric sensor according to claim 4, wherein the state where no light is transmitted by the light transmitter includes a period for which sensitivity of the photoelectric sensor is automatically adjusted.

8. The photoelectric sensor according to claim 4, wherein the state where no light is transmitted by the light transmitter includes a period for which the photoelectric sensor causes the light transmitter to stop transmitting light in accordance with an instruction from outside.

9. A photoelectric sensor to detect presence or absence of a target object by performing a light transmission/reception process, the photoelectric sensor comprising:
   a light transmitter that transmits light;
   a light receiver that receives reflected light of the light transmitted by the light transmitter, the light receiver including a one-dimensional position sensitive element that outputs a first received light signal and a second received light signal that change depending on a position where the reflected light is received; and
   processing circuitry configured to
      detect a disturbance by comparing a light reception result obtained by the light receiver with a first threshold and with a second threshold for a predetermined period in a state where no light is transmitted by the light transmitter, the second threshold taking a value of a sign opposite to that of the first threshold relative to a no-signal state, the light reception result being a distance signal generated from the first received light signal and the second received light signal;

wait, after detection of the disturbance, for the light reception result obtained by the light receiver to become within a range from the first threshold to the second threshold;

perform detection of the disturbance again after the waiting has finished; and instruct the light transmitter to transmit light when no disturbance is detected for a predetermined period, wherein the processing circuitry is further configured to determine that the disturbance has occurred when the light reception result is larger than the first threshold or is smaller than the second threshold, and cause the photoelectric sensor to be idle for a predetermined period after every light transmission/reception process performed by the photoelectric sensor.

10. The photoelectric sensor according to claim 9, wherein the processing circuitry is further configured to:

count a number of times the disturbance has been detected, and instruct the light transmitter to transmit light when the counted number of times is larger than a predetermined value after the waiting has finished.

11. The photoelectric sensor according to claim 10, wherein the processing circuitry is further configured to collectively count a number of times the disturbance has been detected as a result of the light reception result becoming larger than the first threshold and as a result of the light reception result becoming larger than the second threshold, and wherein the type determination unit causes the light transmission processing circuitry is further configured to instruct the light transmitter to transmit light when the counted number of times is larger than a first predetermined value after the waiting has finished from when the light reception result has become larger than the first threshold, or when the counted number of times is larger than a second predetermined value larger than the first predetermined value after the waiting has finished from when the light reception result has become larger than the second threshold.

12. The photoelectric sensor according to claim 10, wherein the processing circuitry is further configured to instruct, after an elapse of a delay time that is adjusted so that the presence or absence of the target object is determined at a timing at which the light reception result involving the disturbance becomes smaller than or equal to the first threshold, the light transmitter to transmit light.

13. The photoelectric sensor according to claim 12, wherein the processing circuitry is further configured to set the delay time in accordance with a frequency of the disturbance determined from the light reception result obtained by the light receiver in the state where no light is transmitted by the light transmitter.

14. The photoelectric sensor according to claim 13, wherein the state where no light is transmitted by the light transmitter includes a period between light transmission/reception processes performed by the photoelectric sensor.

15. The photoelectric sensor according to claim 13, wherein the state where no light is transmitted by the light transmitter includes a period after the photoelectric sensor is powered on and before the light transmitter transmits light for a first time.

16. The photoelectric sensor according to claim 13, wherein the state where no light is transmitted by the light transmitter includes a period for which the photoelectric sensor automatically adjusts a settable distance.

17. The photoelectric sensor according to claim 13, wherein the state where no light is transmitted by the light transmitter includes a period for which the photoelectric sensor causes the light transmitter to stop transmitting light in accordance with an instruction from outside.

18. A photoelectric sensor to detect presence or absence of a target object by performing a light transmission/reception process, the photoelectric sensor comprising:

a light transmitter that transmits light;

a light receiver that receives reflected light of the light transmitted by the light transmitter, the light receiver including a one-dimensional position sensitive element that outputs a first received light signal and a second received light signal that change depending on a position where the reflected light is received; and processing circuitry configured to detect a disturbance by comparing a light reception result obtained by the light receiver with a first threshold and with a second threshold for a predetermined period in a state where no light is transmitted by the light transmitter, the second threshold taking a value of a sign opposite to that of the first threshold relative to a no-signal state, the light reception result being a distance signal generated from the first received light signal and the second received light signal;

wait, after detection of the disturbance, for the light reception result obtained by the light receiver to become within a range from the first threshold to the second threshold;

perform detection of the disturbance again after the waiting has finished; and instruct the light transmitter to transmit light when no disturbance is detected for a predetermined period, wherein the processing circuitry is further configured to separately count a first number of times the disturbance has been detected as a result of the light reception result becoming larger than the first threshold and a second number of times the disturbance has been detected as a result of the light reception result becoming larger than the second threshold, and wherein the processing circuitry is further configured to instruct the light transmitter to transmit light when the counted first number of times is larger than a first predetermined value after the waiting has finished from when the light reception result has become larger than the first threshold, or when the counted second number of times is larger than a second predetermined value larger than the first predetermined value after the waiting has finished from when the light reception result has become larger than the second threshold.

\* \* \* \* \*